United States Patent
Steinlage et al.

(10) Patent No.: US 7,104,341 B2
(45) Date of Patent: Sep. 12, 2006

(54) LOW DISTURBANCE DEEP TILLAGE POINT

(75) Inventors: David Lee Steinlage, Adel, IA (US);
Aron Wesley Fleichmann, Ankeny, IA (US); Mark Donald Beeck, Ankeny, IA (US); Brian E. Myers, Basehor, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/666,474

(22) Filed: Sep. 19, 2003

(65) Prior Publication Data

US 2005/0072345 A1    Apr. 7, 2005

(51) Int. Cl.
*A01B 39/20* (2006.01)

(52) U.S. Cl. .................. 172/730; 172/771; 172/772.5

(58) Field of Classification Search ............... 172/681, 172/698, 699, 713, 721, 730, 732, 747, 765, 172/770, 771, 772, 772.5
See application file for complete search history.

(56) References Cited

U.S. PATENT DOCUMENTS

| | | |
|---|---|---|
| 774,324 A | 11/1904 | Hill et al. |
| 1,603,486 A | 10/1926 | Mock |
| 2,302,785 A * | 11/1942 | Mansur ............... 172/730 |
| 2,419,633 A * | 4/1947 | Douglass ............... 171/83 |
| 2,688,475 A * | 9/1954 | Small ............... 172/762 |
| 3,002,574 A * | 10/1961 | Padrick ............... 172/699 |
| 3,136,077 A * | 6/1964 | Troeppl ............... 37/452 |
| 3,171,500 A | 3/1965 | Dils, Jr. |
| 3,191,323 A * | 6/1965 | Compagnoni ............... 37/455 |
| 3,202,222 A * | 8/1965 | Norris ............... 172/177 |
| 3,305,029 A * | 2/1967 | Shelton ............... 172/713 |
| 3,777,500 A * | 12/1973 | Kelley ............... 405/180 |
| 4,245,706 A | 1/1981 | Dietrich, Sr. ............... 172/180 |
| 4,403,662 A | 9/1983 | Dietrich, Sr. ............... 172/156 |
| 4,538,689 A | 9/1985 | Dietrich, Sr. ............... 172/700 |
| 4,580,639 A * | 4/1986 | Johnson ............... 172/730 |
| 5,165,487 A * | 11/1992 | Williams et al. ............ 172/699 |
| 5,437,337 A | 8/1995 | Dietrich, Sr. ............... 172/196 |
| 5,499,686 A | 3/1996 | Parker ............... 172/730 |
| 5,540,288 A * | 7/1996 | Dietrich, Sr. ............... 172/196 |
| 5,579,852 A * | 12/1996 | Woodward et al. ......... 172/721 |
| 5,743,033 A * | 4/1998 | Gegel ............... 37/460 |
| D415,173 S | 10/1999 | Zaun ............... D15/29 |
| D429,256 S | 8/2000 | Zaun ............... D15/29 |
| D429,257 S | 8/2000 | Zaun ............... D15/29 |
| D429,258 S | 8/2000 | Zaun ............... D15/29 |
| 6,276,462 B1 | 8/2001 | Dietrich, Sr. ............... 172/138 |
| 6,315,057 B1 * | 11/2001 | Borter ............... 172/753 |

(Continued)

FOREIGN PATENT DOCUMENTS

GB    2 209 651 A  *  5/1989

*Primary Examiner*—Victor Batson

(57) ABSTRACT

Ripper point structure includes a nose with a tapered top that initiates lift and fracture of compacted soil layers. The tapered top with an included angle of about 100 degrees just forward of the parting wear shin creates a parting stress which increases until the center portion of the soil profile is cut by a sharp leading edge of the shin. In a winged embodiment, gently sloping ripper point wings gradually enter the fracture plane left below the lifted compaction layer and initiate a second fracture of the soil profile. The wings are spaced rearwardly from the point so that the point and wear shin have enough time to lift, fracture, and part the soil profile in contact with the shank prior to any wing action.

12 Claims, 4 Drawing Sheets

U.S. PATENT DOCUMENTS 6,357,368 B1 * 3/2002 Swab et al. ................. 111/152

6,443,237 B1 * 9/2002 Myers et al. ................ 172/730

* cited by examiner

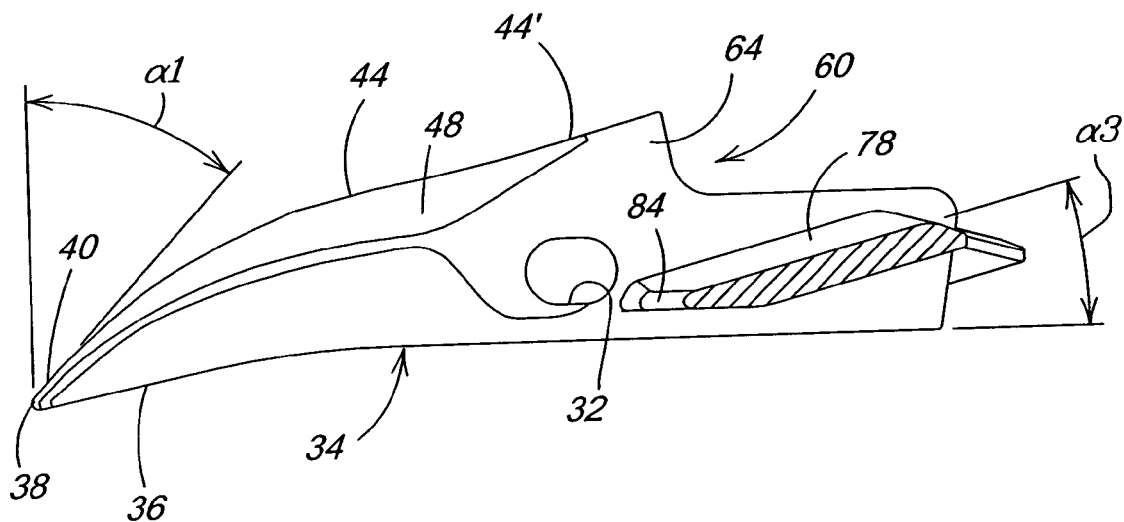

LOW DISTURBANCE DEEP TILLAGE POINT

FIELD OF THE INVENTION

The present invention relates generally to agricultural tillage equipment and, more specifically, to deep tillage points providing low surface disturbance.

BACKGROUND OF THE INVENTION

Deep tillage points such as shown in U.S. Pat. Nos. 5,437,337 and 5,540,288 have been designed to leave soil surface relatively level while still achieving substantial sub-soil fracturing. In commonly assigned U.S. Pat. No. 6,443,237 a central body or point with opposed wings extend downwardly and laterally is shown. The upper surface of each of the wings forms an upward angle in the rearward direction of approximately 15 degrees with the horizontal. The point is slid onto a lower mounting portion of a ripper shank, and a bolt is inserted through a hole in the shank and a set of slots in the lower rear portion of the point. The bolt, hole, and slot arrangement provides a loose connection between the shank and the point and functions primarily to retain the point when the point is out of the ground. Ground reaction forces are transferred directly from the point to the mounting portion so that the bolt is not heavily loaded during tillage operations.

Although the deep tillage points described above have reduced ground disturbance compared to many other previously available point designs, farmers continue to require lessened soil disturbance. Conservation farmers desire a relatively wide point for fracturing but still want low surface disturbance and high residue retention, particularly when operating in highly erodible land conditions. An improved point structure is necessary that provides the high fracture, high residue, low surface disturbance ripping desired by many farmers today. In addition, it is desirable to provide a point structure which reduces need for leveling and/or slot closing wheels. In point structures such as described above, lifted soil falling from the back edges of the wings it is not able to drop fully because the edges are located along side the shank. Soil flow beside the shank creates a substantial amount of wear on the rear of the shank as the soil tries to drop back towards the ripper slot. Also, surface disturbance is created by soil flowing aggressively around the back edge of the ripper shank towards the ripper slot.

In many point structures, the thin hardware attaching surfaces or walls at the rear of the point are the limiting factor in attempts to extend point life. The carbides used to extend the wear life often deposit in the thin section around the attaching bolt slot and result in brittleness and part breakage. Therefore, the thin walls were the limiting factor in the amount of carbides that could be used without risk of cracking.

Farmers often desire to simply leave a slot in the soil for better moisture absorption and air infiltration. In such situations, a wingless ripper point for inter-row ripping in standing crops is necessary.

SUMMARY OF THE INVENTION

Deep tillage ripper point structure includes a nose designed for interaction between the wear shin and ripper point wings to provide high fracture and high residue ripping with low surface disturbance. Spring-loaded smooth coulters placed directly in front of the ripper shanks prevent hair-pinning of residue around shanks and place a vertical fracture plane in the soil profile directly in front of the shank. The ripper point and shank pass through the slot formed by the coulter to provide a fractured, minimally disturbed surface profile.

The point nose has a tapered top and initiates lift and fracture of compacted soil layers commonly found in previously tilled and untilled soils. As the compaction plane is lifted, a fracture plane is created below the lifted compaction plane. The compaction plane is forced up the leading face of the ripper point. Soil profile parting is initiated by the tapered top of the ripper point which defines an included angle of approximately 100 degrees just forward of the parting wear shin. This parting action of the compaction soil layer creates a parting stress extending up through the soil profile to the bottom of the coulter slot. As the soil moves and lifts up the tapered top surface of the point, the parting stress increases until the center portion of the soil profile is cut by a sharp leading edge of the wear shin having an included angle of approximately 30 degrees. The soil cut by the wear shin begins to part to the side of the shank, and the lift angle of the soil flowing by the shank begins to reduce from a positive angle of about 8 to 20 degrees to a more level state of about 5 to 15 degrees.

As lifted soil flows beside the shank, gently sloping forwardly and laterally extending ripper point wings fracture the soil a second time. The leading edges of the ripper wings angle rearwardly at about 45 degrees and are located below the top ripping plane of the ripper point. The wings therefore gradually enter the fracture plane left below the lifted compaction layer and initiate a second fracture of the soil profile. The wings are also designed to run in the fracture plane to provide for a low draft entry of the wings under the compaction layer.

The relationship of the wings to the point and the rear of the shank provide substantial advantage over most conventional point structures. The wings are spaced far enough rearward from the point so that the point and wear shin have enough time to lift, fracture, and part the soil profile in contact with the shank prior to any wing action. After the parting action of the soil profile is completed, the upward lift momentum of the soil is reduced as it flows around the shank. The soil lift begins to drop or level out and simultaneously the second lift of the soil profile is initiated. By waiting for the point-initiated upward momentum of the soil profile to decrease, wider and more aggressive wings can be utilized. For example, point structures with wings having widths greater than 9 to 12 inches and lift angles of approximately 15 to 25 degrees maximize the full-width fracture of the profile without compromising low soil surface disturbance and high surface residue. Wing downward slope in the outward direction can be in the range of approximately 0 to 15 degrees to provide the desired fracture action without unwanted surface disturbance.

In an embodiment wherein the wings are located more rearwardly relative to the standard compared to many previously available point structures, soil lifted by the wings falls behind the standard as well as beside the standard to help provide a level and undisturbed soil profile and close the ripper slot. The need for leveling and/or slot closing wheels is reduced compared to many of the current ripper points having wings in a more forward position relative to the shank. Lifted soil falling from the back edges of the wings can drop directly into the slot so that soil flow aggressiveness around the rear of the shank is reduced to help minimize surface disturbance and reduce wear at the back of the shank.

The shank-attaching structure of the point includes a large countersunk slot or oval cavity receiving a flange mounting bolt. The oval cavity allows the bolt head and nut to be recessed into the casting to prevent wear on the hex surfaces. The slot is large enough to provide access for a socket, or an open-ended wrench placed at an angle. To provide room for the countersunk slots, the rear walls of the ripper points are made thicker compared to most conventional point constructions with the wall thickness being on the order of half an inch or more. The thickened walls of the attaching structure not only protect the mounting hardware but also permit use of a higher wear material such as carbidic austempered ductile iron without increased risk of breakage from brittleness. The bolt does not bear the working load of the ripper point but simply keeps the point on while the ripper is in a non-working position or the standard is resetting.

A wingless point is also provided which generally has the design characteristics of the winged version except for the wings and rear shank mounting material. The wingless point weighs substantially less than the winged version and will provides an excellent lower cost, low disturbance ripper point.

These and other objects, features and advantages of the present invention will become apparent from the detailed description below in view of the drawings.

BRIEF DESCRIPTION OF THE DRAWINGS

FIG. 5 is a side view of the point of FIG. 3, partially in section, taken generally along lines 5—5 of FIG. 4.

FIG. 6 is a rear view of the point of FIG. 3.

DESCRIPTION OF THE PREFERRED EMBODIMENT

Figure 1:
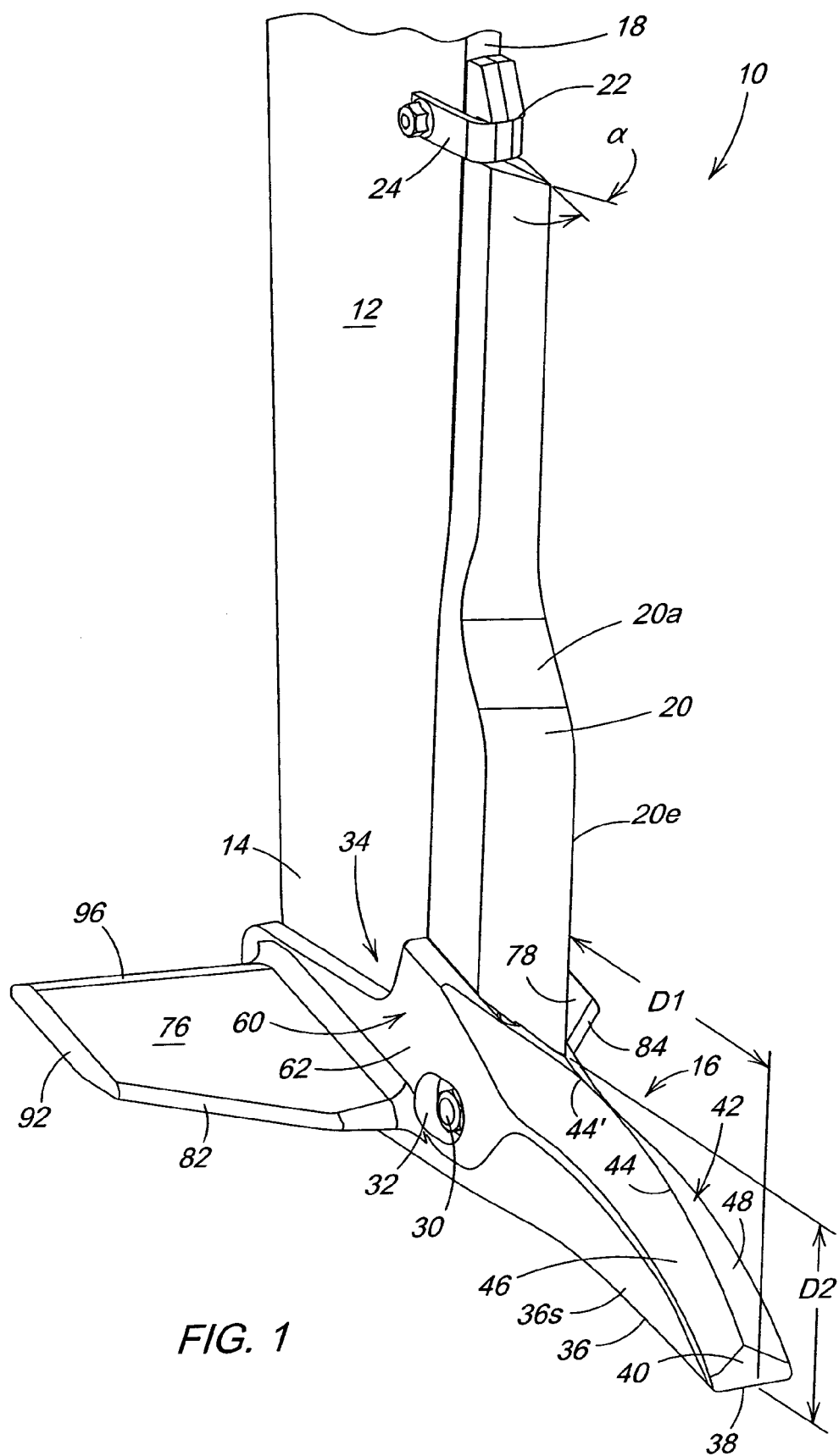
FIG. 1 is a front perspective view of a winged point supported on a ripper standard.

Referring to FIG. 1, therein is shown a ripper standard assembly 10 including an upright narrow standard or shank 12 having an upper end adapted for support by a ripper frame (not shown) and a lower mounting end 14 receiving a ripper point 16. The standard 12 had a leading edge or surface 18 which supports a parting fin or wear shin 20 having a back surface abutting the surface 18 of the shin 20. An upper notched end 22 is fixed to the shank 12 by a bolted bracket 24, and the lower end of the shin 20 is received by the point 16. The point 16 is slid onto the lower end 14 and a bolt 30 is inserted through a hole in the shank 12 and a set of slots 32 in the point to retain the point during transport and tripping of the standard. Ground reaction forces are transferred directly from the point 16 to the end 14 so that the bolt 30 is not heavily loaded during tillage operations.

The point 16 has a main body 34 with nose 36 having a horizontal front edge 38 and forward face 40 angling upwardly and rearwardly to a tapered top 42. The top 42 curves gently rearwardly towards the shank 12 and defines a curved apex 44. Outwardly directed right and left surfaces 46 and 48 angling downwardly from the apex 44 towards upright sides 36s of the nose 36. As shown, the top 42 is sharply tapered, and the surfaces 46 and 48 define an obtuse included angle from the forward face 40 to the wear shin 20.

The fore-and-aft distance (D1 of FIG. 1) between the front edge 38 and the shin 20 is approximately twice the vertical distance (D2) between the edge and the apex at the area 44' just forward of the shin 20. The forward face 40 of the nose 36 angles upwardly in the rearward direction at an angle of $\alpha 1$ (FIG. 5). The width of the nose 36, or the distance between the sides 36s, is less than half of D2. By way of example only, good tapered nose soil action is provided with $\alpha 1$=42 degrees, D1=7.06 inches, D2=3.86 inches and a nose width of 1.75 inches. The included angle at the apex of the area 44' is about 100 degrees.

The wear shin 20 has a sharp leading edge 20e defining an included angle $\alpha$ substantially less than 45 degrees and shown at an angle of only about 30 degrees. The edge 20e extends vertically from the area of the bracket 24 and forwardly and then downwardly at 20a to a location adjacent the area 44'. The lower portion of the wear shin 20 is supported by the top of the main body 34. The sharp edge 20e cuts the center portion of the soil profile lifted upwardly by the nose 36.

Figure 3:
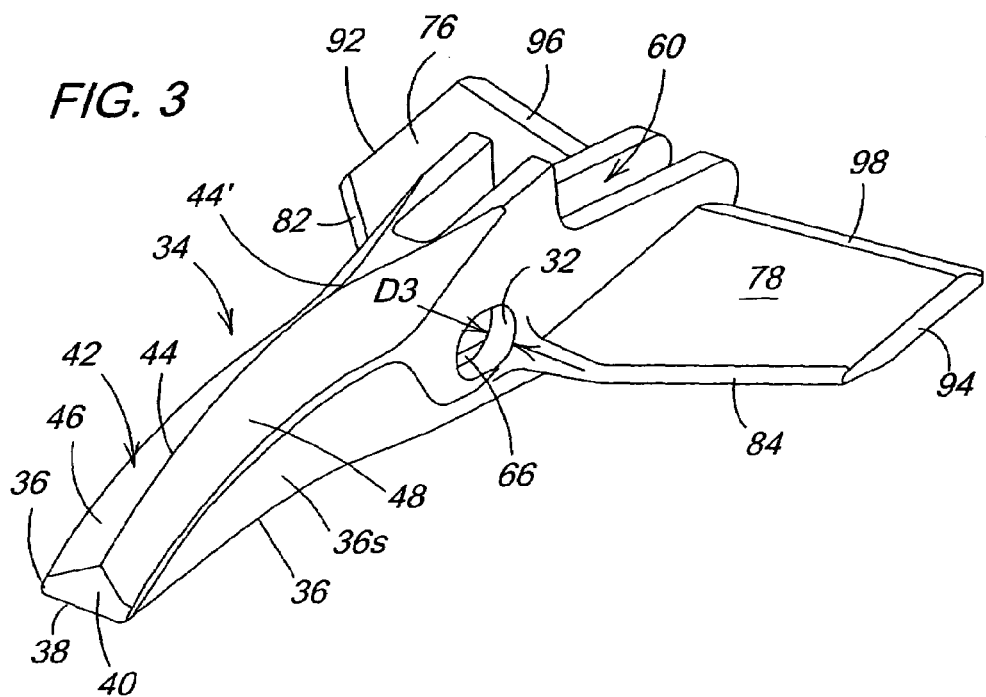
FIG. 3 is a perspective view of the winged point of FIG. 1.

The main body 34 includes a bifurcated mounting area 60 with upright walls 62 located rearwardly of the nose 36 for support by the mounting end 14 of the standard 12. The surfaces 46 and 48 part laterally at the area 44' and extend rearwardly of the shin edge 20e to raised sidewall portions 64 which embrace the shin 20. The walls 62 are relatively thick, and wall thickness at the slots 32 (D3 of FIG. 3) is at least a half an inch. A lower cavity 66 in the mounting area 60 receives an apertured forward projection on the mounting end 14. The cavity 66 has an upwardly opening U-shaped cross section (FIG. 6). The slots 32 in the point 16 align with the mounting end aperture to receive the mounting bolt 30 for point retention. The increased wall thickness at the areas of the slots 32 allows the bolt end and fastening nut to be recessed for reducing mounting hardware wear during tillage operations and permits casting of the point 16 from a higher wear material such as carbidic austempered ductile iron without the increased risk of breakage from brittleness. The slots 32 are sufficiently large for tool insertion when the point is removed or attached.

Figure 2:
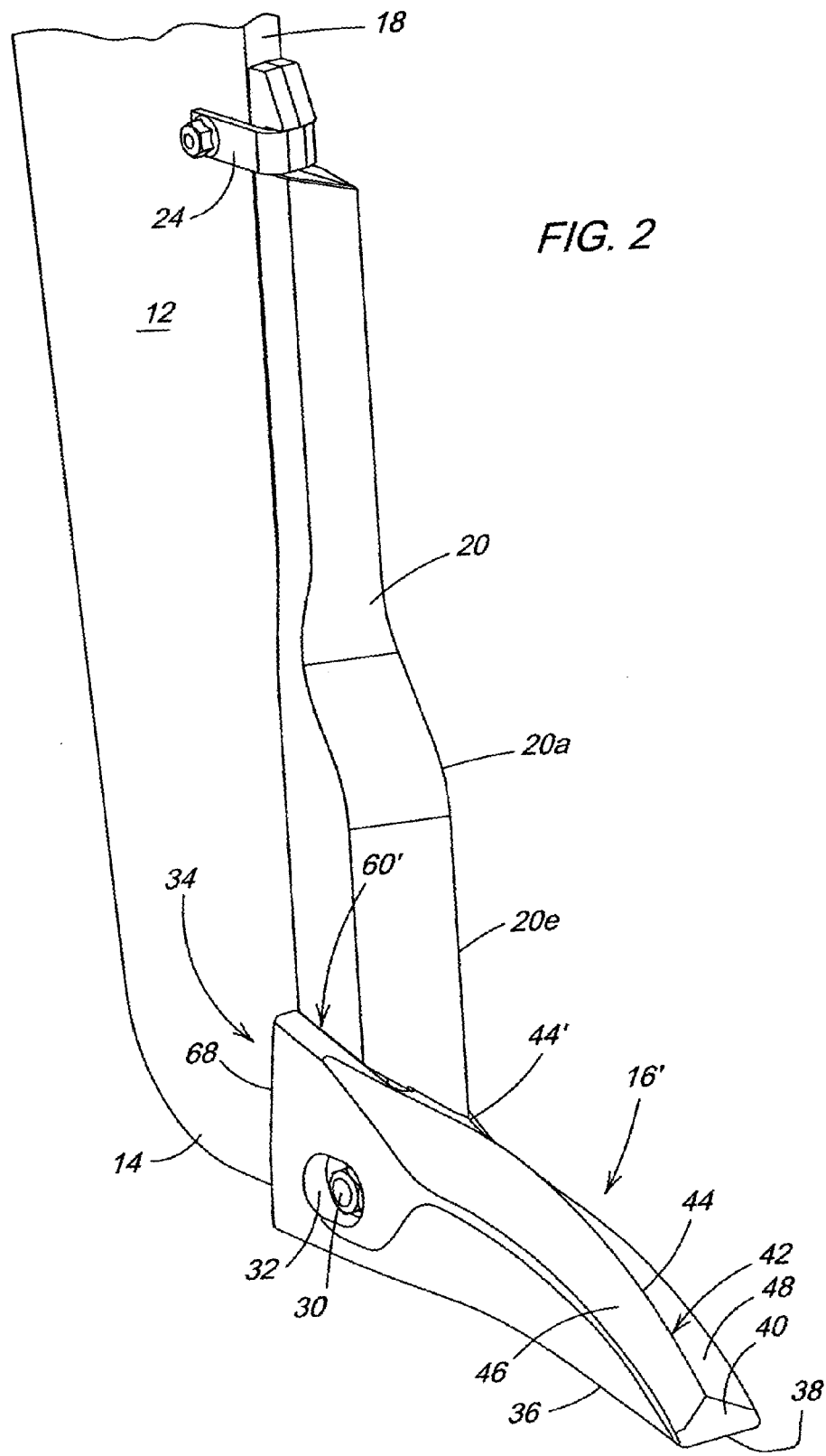
FIG. 2 is a view similar to FIG. 1 but showing a wingless point.

In the wingless version of the point (FIG. 2), mounting area 60' on main body 34' of ripper point 16' terminates in upright rear edges 68 generally aligned with the front edge 18 of the standard 12. The construction and operation of the nose 36 and shin 20 of the wingless point 16' are generally identical to that of the winged point 16 (FIG. 1), and locations on the wingless point 16' are labeled similarly to that of the point 16.

The edge 38 and the face 40 of the nose 36 initiate fracture of compacted soil layers. As the compaction plane is forced upwardly and lifted by the face 40, parting action of the soil profile is initiated by the top 42 because of the relatively sharp angle between the surfaces 46 and 48 at the apex 44. The parting action of the soil profile creates an upwardly extending parting stress through the soil profile the bottom of a four to six inch vertical slot formed by a spring-loaded coulter (not shown) or similar device. The coulter leads the standard 12 and prevents hair pinning while forming a vertical fracture plane directly ahead of the standard. The parting stress increases as the soil profile moves up the curved top 42, and the profile is then cut by the sharp leading edge 20e of the wear shin 20. The soil cut by the edge 20e parts to the side of the standard 12 aided by the aft portions of the outwardly directed surfaces 46 and 48 which extend rearwardly of the edge 20e. Soil flow around the mounting area 60 (60') and around the mounting end 14 reduces from an angle within a range of angles from about 8 to 20 degrees to a more level state within a range of values from about 5 to 15 degrees. The recessed slots 32 in the relatively thick walls protect the head and nut of the bolt 30 from abrasive soil action.

Figure 4:
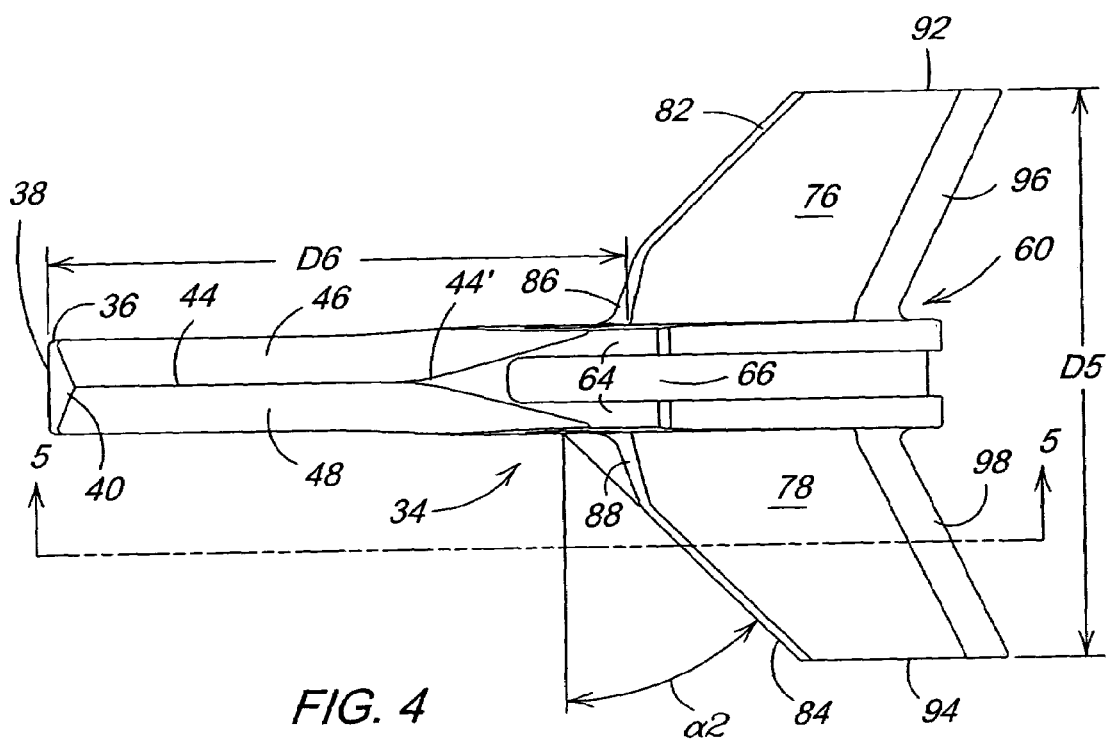
FIG. 4 is a top view of the point of FIG. 3.

The winged point 16 (FIGS. 1 and 3–6) includes outwardly directed wings 76 and 78 having leading edges 82 and 84 adjacent a lower portion of the main body 34. The leading edges 82 and 84 form an acute angle α2 (FIG. 4) with a vertical plane extending transversely to the forward direction of travel. The angle α2 is in a range of between 30 to 60 degrees and is shown at 45 degrees. Inner portions 86 and 88 of the leading edges are located adjacent the aft ends of the slots 32 and extend outwardly at an angle with the transverse vertical plane greater than 60 degrees for a short distance. The wings 76 and 78 have parallel fore-and-aft outer edges 92 and 94 extending rearwardly from the leading edges 82 and 84 to aft edges 96 and 98 so wing width remains constant as the wings wear.

Wing width (D5 of FIG. 4) can vary depending on the point action desired. Good action is provided in many soil conditions with D5 at about 10.5 inches, but D5 can vary upwardly to about 12 inches depending on the preferred fracture width. A distance D6 of about 10.5 inches between the start of the front edge of the wings 86 and 88 and the front edge 38 of the nose 36 provides good soil action. The distance D6 can be increased but having the wings forward helps reduce draft slightly since the soil is lifted nearer the point soil lift action.

The lift angle or angle between a fore-and-aft line tangent to the top surface of the wings 76 and 78 and a horizontal plane (α3 of FIG. 5) is approximately 15 degrees. A range of α3 angles from about 15 degrees to 25 degrees provides good soil action. Wing downward slope in the outward direction (α4 of FIG. 6) is within a range of 0.0 degrees to 15 degrees and is shown at 7 degrees.

With the winged point 16, after lifted soil begins to flow around the standard 12 the soil is fractured a second time by the gently sloping wings 76 and 78. The leading edges 82 and 84 are located below the top ripping plane of the nose 36 and gradually enter the fracture plane left below the lifted compaction layer. The wings thereby initiate a second fracture of the soil profile. Since the wings 76 and 78 enter and run in the fracture plane, a low draft entry of the wings into the plane under the compaction layer is provided.

The wings 76 and 78 are spaced rearwardly from the point a sufficient distance so the nose 36 and wear shin 20 have enough time to lift, fracture and part the soil profile in contact with the standard 12 prior to the wings 76 and 78 initiating further action on the soil profile. After the nose 36 and wear shin 20 part the soil profile and as the upward momentum of the soil lessens, the second lift of the soil profile is initiated by the wings. By providing a point construction that allows the soil profile to lose nose-initiated upward momentum before wing contact, wider and more aggressive wings can be utilized without compromising a smooth ground surface. The aft edges 96 and 98 of the wings 76 and 78 adjacent the standard 12 are located forwardly of the rear edge of the standard. Lifted soil falling from the aft edges 96 and 98 can drop directly into the slot formed behind the standard 12 so that soil flow aggressiveness around the rear of the standard is reduced to help minimize surface disturbance and reduce wear at the back of the standard.

Having described the preferred embodiment, it will become apparent that various modifications can be made without departing from the scope of the invention as defined in the accompanying claims.

We claim:

1. A deep tillage point structure adapted for connection to an upright shank for forward movement through a compacted layer of soil, the point structure comprising: a main body having a fore-and-aft extending leading nose with a front surface which extends upwardly and rearwardly from a nose leading edge for initiating fracture of the compacted layer, a tapered top surface extending rearwardly and upwardly from the front surface, the tapered top surface including outwardly facing surfaces extending downwardly from an apex, the apex extending from adjacent the nose leading edge and terminating in an apex aft end at a central fore-and-aft location on the main body, the surfaces forming an included angle at the apex and causing an initial parting stress of the fractured compacted layer as soil moves rearwardly along a length of the apex to an uppermost rear portion of the apex adjacent the upright shank, wherein the length of the apex is substantially greater than a distance equal to a maximum height of the apex above the nose leading edge and the included angle is obtuse substantially the entire length of the apex and approximately 100 degrees adjacent the aft end of the apex to facilitate soil parting by the upright shank in the initially stressed fractured compacted layer, and wherein wings include forwardmost portions located behind the aft end of the apex.

2. The point structure as set forth in claim 1 including a shin member extending vertically from an aft portion of the nose, the shin member having a sharp leading edge for parting the compacted layer as the soil moves rearwardly past the nose.

3. The point structure as set forth in claim 2 wherein the leading edge of the shin member defines an included angle of less than 45 degrees.

4. The point structure as set forth in claim 2 wherein the included angle is approximately 30 degrees.

5. The point structure as set forth in claim 2 wherein the outwardly facing surfaces extend rearwardly past the sharp leading edge to help move the soil outwardly from the shank.

6. A deep tillage point structure including upright shank structure having a leading edge and movable forwardly through a compacted layer of soil, the point structure including a main body having a fore-and-aft extending leading nose with a front surface which extends upwardly and rearwardly from a nose leading edge for initiating fracture of the compacted layer, a tapered top surface extending rearwardly and upwardly from the front surface, the tapered top surface including outwardly facing surfaces extending downwardly from an apex, the apex extending from adjacent the leading nose to an aft end at a central portion of the main body portion, the surfaces forming an included angle at the apex and causing a lifting of the fractured compacted layer as soil moves rearwardly along a length of the apex to an uppermost rear portion of the apex adjacent the leading edge of the upright shank structure, and further comprising wings having leading edges located substantially entirely behind the aft end of the apex and extending outwardly from the body rearwardly adjacent the nose and below the aft end of the apex for entering a fracture area initiated by the front surface, wherein substantial portions of the wings lie behind the leading edge of the upright shank and enter an area of the soil below the fractured compacted layer to thereby reduce draft entry of the wings.

7. The point structure as set forth in claim 6 wherein the wings have a lift angle between 15 and 25 degrees.

8. The point structure as set forth in claim 6 wherein the wings slope downwardly in an outward direction at an angle less than 15 degrees.

9. The point structure as set forth in claim 8 wherein the wings slope downwardly at an angle of approximately 7 degrees.

10. The point structure as set forth in claim 6 wherein the wings have a wing width of less than 12 inches and greater than 6 inches.

11. The point structure as set forth in claim 6 wherein the wings have leading edges angled rearwardly at an acute angle relative to a vertical plane extending perpendicular to a forward direction of travel of the point structure.

12. The point structure as set forth in claim 10 wherein the wings have leading edges spaced rearwardly from the nose leading edge about 10 inches.

* * * * *